(12) United States Patent
Nakayama et al.

(10) Patent No.: US 6,949,859 B2
(45) Date of Patent: Sep. 27, 2005

(54) COMMUTATOR ASSEMBLY FOR MOTOR

(75) Inventors: Eiji Nakayama, Tokyo (JP);
Masayoshi Yamamoto, Tokyo (JP);
Katsumi Ohata, Tokyo (JP); Keigo Okada, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 455 days.

(21) Appl. No.: 09/962,134

(22) Filed: Sep. 26, 2001

(65) Prior Publication Data
US 2003/0057798 A1 Mar. 27, 2003

(51) Int. Cl.$^7$ ............................................. H02K 13/04
(52) U.S. Cl. ...................................... 310/234; 310/233
(58) Field of Search ................................. 310/234, 233, 310/211, 214, 216

(56) References Cited

U.S. PATENT DOCUMENTS

| | | | | |
|---|---|---|---|---|
| 3,061,749 A | * | 10/1962 | Hohler et al. | 310/234 |
| 4,326,140 A | * | 4/1982 | Rohloff | 310/234 |
| 6,218,755 B1 | | 4/2001 | Tanaka et al. | |

FOREIGN PATENT DOCUMENTS

| | | | |
|---|---|---|---|
| JP | 56-101181 | * | 8/1981 |
| JP | 58-193871 | * | 12/1983 |
| JP | 58-193764 | | 12/1988 |
| JP | 05-095184 | * | 12/1993 |
| JP | 07-222407 | * | 8/1995 |
| JP | 07-298565 | * | 11/1995 |
| JP | 11-027907 | * | 1/1999 |
| JP | 11-299180 | * | 10/1999 |
| JP | 2001-103715 | | 4/2001 |

OTHER PUBLICATIONS

Korean Office Action for 10–2001–0012609 dated Jan. 30, 2003.*
Japanese Office Action for 2000–140713 dated Nov. 29, 2002.*

* cited by examiner

Primary Examiner—Thanh Lam
(74) Attorney, Agent, or Firm—Sughrue Mion, PLLC

(57) ABSTRACT

A commutator assembly for a motor has a recessed portion formed to each commutator segment so that coils, which are pressed and deformed by bending the hooks of commutator segments, can be accommodated in the recessed portion. With this arrangement, the commutator assembly can improve the reliability of electric connection of the hook of the commutator segments with a conductive wire.

5 Claims, 15 Drawing Sheets

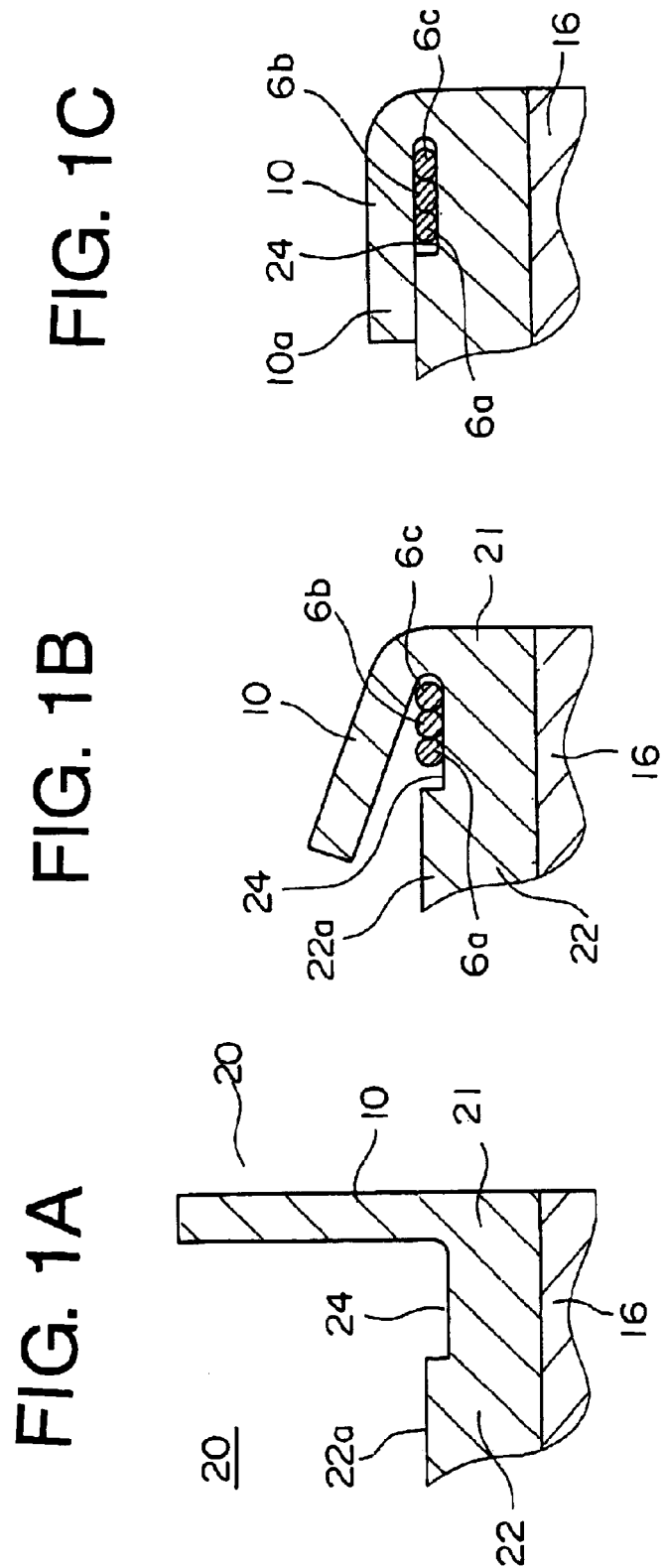

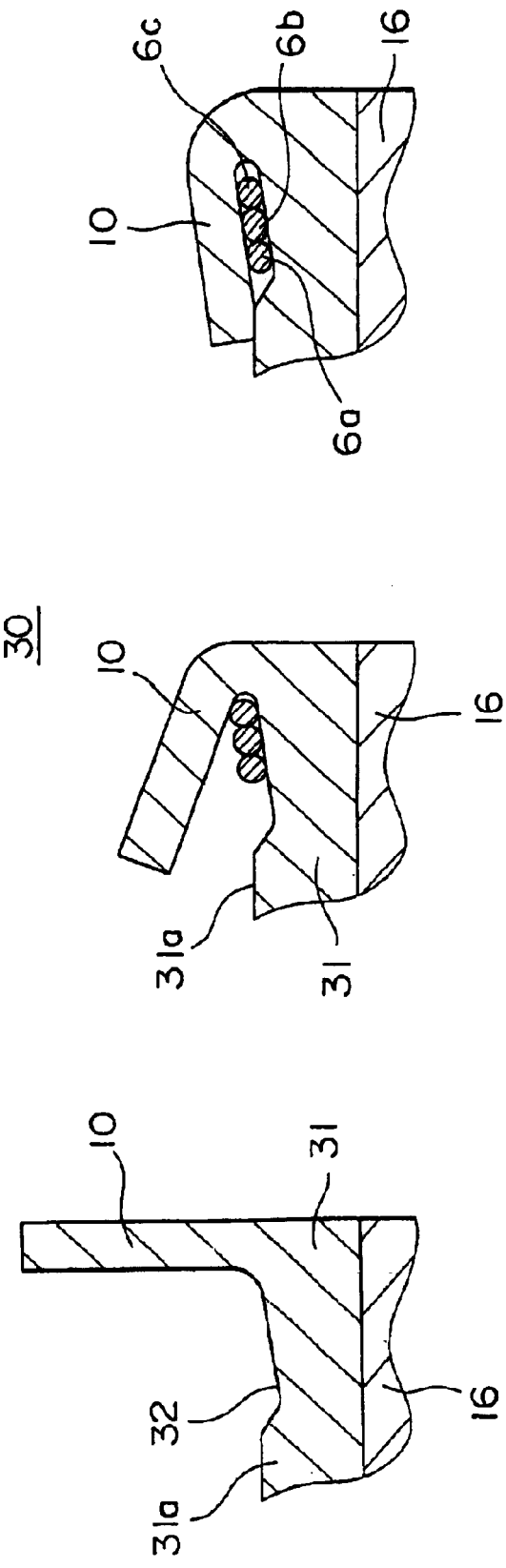

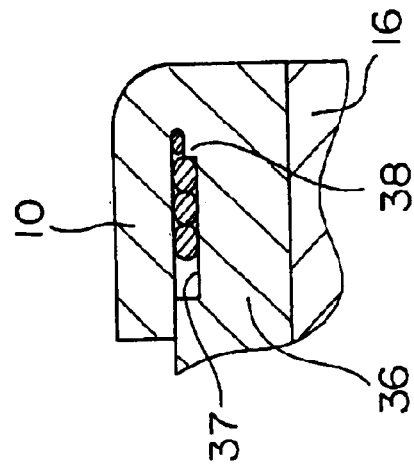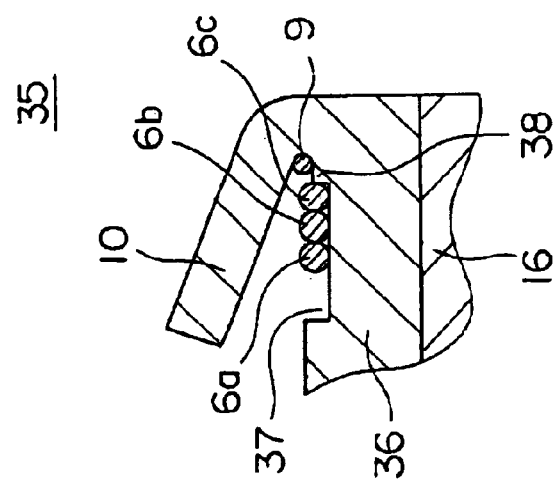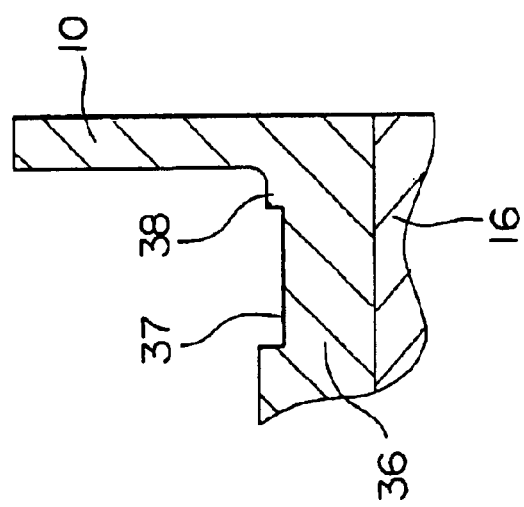

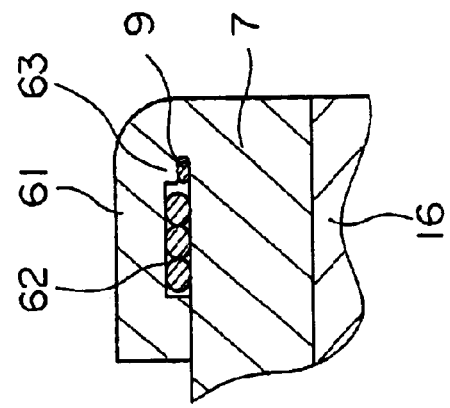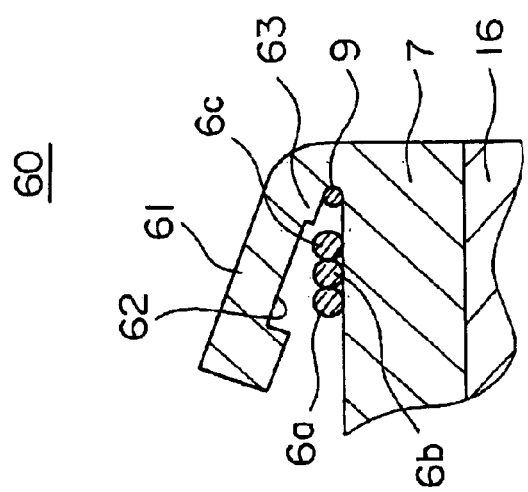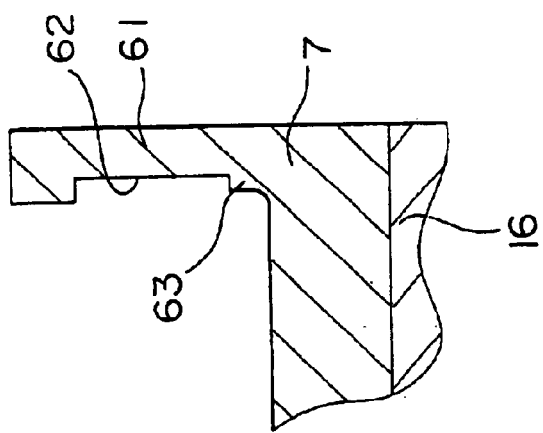

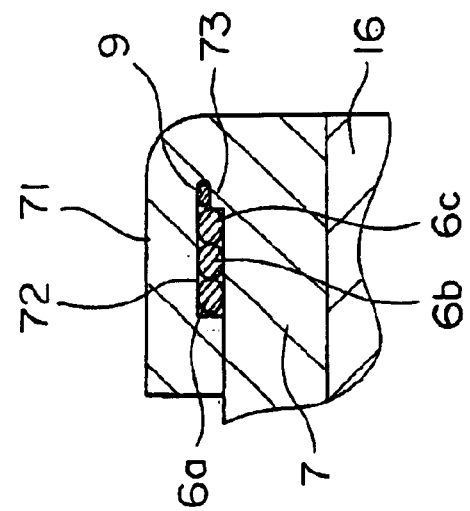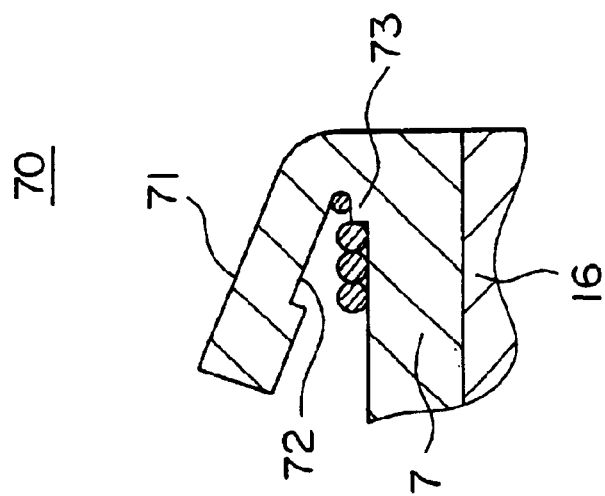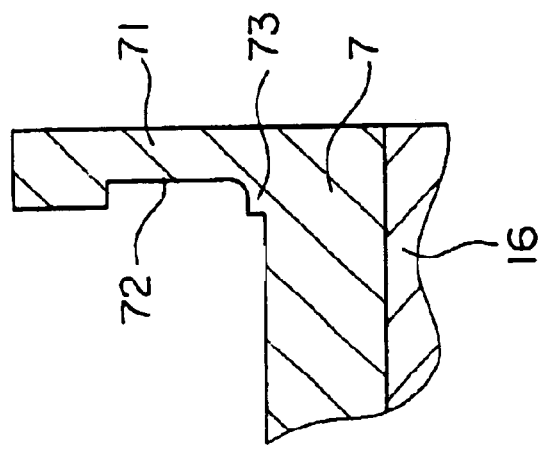

COMMUTATOR ASSEMBLY FOR MOTOR

BACKGROUND OF THE INVENTION

1. Field of the Invention

The present invention relates to a commutator assembly for a motor in which conductive wires are electrically connected to a hook formed on one side of a commutator segment of a commutator.

2. Description of the Related Art

FIG. 13 is a front sectional view of a main portion of a conventional motor, FIGS. 14 to 16 are enlarged views of a main portion of a commutator assembly and show respective steps until coils are locked to hooks.

The motor includes a cylindrical yoke, a permanent magnet composed of four ferrites secured in the yoke in a peripheral direction at intervals, a shaft 1 disposed in the yoke through bearings so as to be rotate freely, an armature 2 secured to the shaft 1, and a commutator assembly 3 disposed on one side of the armature 2. Note that the yoke and the permanent magnet are not illustrated.

The armature 2 is composed of an iron core 4 and a winding 5. The iron core 4 has a plurality of slots extending in the axial direction thereof, and the winding 5 is composed of a first coil 6a, a second coil 6b, and a third coil 6c each formed of an enamel-coated copper conductive wire wound around the slots. The winding 5 is constructed by a so-called lap winding method by which a conductive wire is wound, for example, 10 times, then it is displaced by one slot and wound 10 times again.

The commutator assembly 3 is composed of a commutator 8 and four brushes which are placed at equal intervals and caused to come into contact with the surface of the commutator 8 by the elastic force of springs. The commutator 8 is secured to an end of the shaft 1 and composed of commutator segments 7 as many as a plurality of slots disposed on the shaft 1 in the peripheral direction thereof and a base 16 for supporting the commutator segments 7. Locked to the respective hooks 10 of the commutator segments 7 are equalizers 9, which electrically connect commutator segments 7 that should have the same electric potential to each other and come into intimate contact with a side of the commutator 8. The enamel-coated equalizers 9 prevent the occurrence of circulating currents which flow to the brushes due to the difference of voltages induced between the circuits of the winding 5.

In the above motor, the shaft 1 having the iron core 4 secured thereto is inserted into the commutator 8 having the equalizers 9 locked to the hooks 10 and attached to the side thereof. Next, although the winding 5 is formed by winding the coils 6a, 6b, and 6c around the slots of the iron core 4 by the lap winding method, they are locked to the respective hooks 10 of the commutator segments 7 while they are being wound. Thereafter, the respective hooks 10 are electrically connected to the equalizers 9 and the coils 6a, 6b, and 6c, respectively at the same time.

FIG. 14 is a sectional view of a main portion of the commutator assembly 3 before the hook 10 is bent, FIG. 15 is a view when the equalizer 9 and the coils 6a, 6b, and 6c are locked to the hook 10, and FIG. 16 is a view when the hook 10 is bent and then electrically connected to the equalizer 9 and the coils 6a, 6b, and 6c. The electric connection is executed by so-called fusing. That is, the enamel coating of the equalizer 9 and the coils 6a, 6b, and 6c is burnt by Joule's heat by flowing a low voltage and a large current to the hook 10 through an electrode pressed against a surface of the hook 10 so that the equalizer 9 and the coils 6a, 6b, and 6c are caused to be in contact with the commutator segment 7 under pressure, whereby the hook 10 is electrically connected to the equalizer 9 and the coils 6a, 6b, and 6c.

In the motor arranged by the lap winding method as described above, the armature 2, the equalizers 9 and the commutator 8 which are secured to the shaft 1 are rotated together with the shaft 1 by an electromagnetic action by a current supplied to the winding 5 from the outside through the brushes in contact with the commutator segments 7.

In the commutator assembly 3 arranged as described above, the surfaces of the commutator segments 7 in contact with the brushes and the surfaces of the commutator segments 7 facing the hooks 10 are flat. Thus, when the coils 6a, 6b, and 6c are pressed and deformed, the rate of deformation of the coil 6a at the extreme end of the hook 10 is larger than that of the coil 6c at the root of the hook 10, that is, the rates of deformation of the coils 6a, 6b, and 6c are not uniform, from which the following problems arise:

a) when the equalizer 9 at the root of the hook 10 is appropriately deformed to secure the reliability of electric contact of the commutator segment 7 with the equalizer 9 and to secure the mechanical strength of the equalizer 9, the coil 6a on the extreme end side of the hook 10 is more deformed. Thus, the reliability of mechanical strength of the coil 6a is lowered by the excessive deformation thereof, whereby the coil 6a is liable to be broken. This tendency is more remarkable as the number of coils locked to the hook 10 increases; and b) when the deformation of the coils 6a, 6b, and 6c is suppressed to an appropriate degree of deformation to secure the reliability of electric contact of the commutator segment 7 with the coils 6a, 6b, and 6c and to secure the reliability of mechanical strength of the coils 6a, 6b, and 6c, the equalizer 9 at the root of the hook 10 is insufficiently deformed, which lowers the reliability of electric contact of the equalizer 9. In particular, this tendency is remarkable when the equalizer 9 is composed of a material having high mechanical strength and difficult to be deformed such as a brass wire, a red brass wire, and the like. Further, this tendency is remarkable when the equalizer 9 has a small wire diameter.

Furthermore, while the rates of deformation of the coils 6a, 6b, and 6c are controlled by an amount of crush of the hook 10, there is also a problem that it is difficult to control the rates of deformation of them because the amount of crush is dispersed.

SUMMARY OF THE INVENTION

An object of the present invention, which was made to solve the above problems, is to provide a commutator assembly in which the reliability of electric contact of conductive wires and commutator segments is secured as well as the reliability of mechanical strength of the conductive wires is secured.

According to a first aspect of a commutator assembly of the invention, a recessed portion, in which a plurality of conductive wires compressed and deformed by bending hooks are accommodated, is formed to each of commutator segments.

According to a modification of the first aspect of the commutator assembly of the invention, the recessed portion may be formed to the large diameter portion of the commutator segment. The large diameter portion has a diameter larger than the diameter of the portion, with which brushes come into contact, of a commutator and is formed to the root of the hook.

According to a second aspect of the commutator assembly of the invention, a recessed portion, in which a plurality of conductive wires compressed and deformed by bending the hooks are accommodated, is formed to each of hooks.

According to a modification of the first and second aspects of the commutator assembly of the invention, the recessed portion may have an inclining surface formed thereto the depth of which increases as the inclining surface is apart from the root of the hook.

According to a modification of the first and second aspects of the commutator assembly of the invention, a press and deformation promoting unit may be formed to the recessed portion to promote the press and deformation of the conductive wires.

According to a modification of the first and second aspects of the commutator assembly of the invention, the press and deformation promoting means may be composed of a stepped portion.

According to a modification of the first and second aspects of the commutator assembly of the invention, the plurality of conductive wires may include conductive wires having a different wire diameter.

According to a modification of the first and second aspects of the commutator assembly of the invention, the plurality of conductive wires may include conductive wires formed of a different material.

According to a modification of the first and second aspects of the commutator assembly of the invention, the plurality of conductive wires may be a plurality of coils constituting the winding of the armature and equalizers having a wire diameter smaller than that of the coils and electrically connecting commutator segments, which should have the same electric potential, to each other.

According to a modification of the first and second aspects of the commutator assembly of the invention, the plurality of conductive wires may be a plurality of coils constituting the winding of the armature and equalizers formed of a material different from that of the coils and electrically connecting commutator segments, which should have the same electric potential, to each other.

According to a modification of the first and second aspects of the commutator assembly of the invention, the equalizers may be composed of a brass wire having an insulating film formed on the surface thereof.

According to a modification of the first and second aspects of the commutator assembly of the invention, the equalizers may be composed of a red brass wire having an insulating film formed on the surface thereof.

BRIEF DESCRIPTION OF THE DRAWINGS

FIGS. 1A, 1B, and 1C are sectional views of a main portion of a commutator assembly according to an embodiment 1 of the present invention, wherein FIG. 1A is a sectional view before a hook is bent, FIG. 1B is a sectional view when coils and an equalizer are locked to the hook, and FIG. 1C is a sectional view when the hook, the coils, and the equalizer are electrically connected to each other;

FIGS. 2A, 2B, and 2C are sectional views of a main portion of a commutator assembly according to an embodiment 2 of the present invention, wherein FIG. 2A is a sectional view before a hook is bent, FIG. 2B is a sectional view when coils and an equalizer are locked to the hook, and FIG. 3C is a sectional view when the hook, the coils, and the equalizer are electrically connected to each other;

FIGS. 3A, 3B, and 3C are sectional views of a main portion of a commutator assembly according to an embodiment 3 of the present invention, wherein FIG. 3A is a sectional view before a hook is bent, FIG. 3B is a sectional view when coils and an equalizer are locked to the hook, and FIG. 3C is a sectional view when the hook, the coils, and the equalizer are electrically connected to each other;

FIGS. 4A, 4B, and 4C are sectional views of a main portion of a commutator assembly according to an embodiment 4 of the present invention, wherein FIG. 4A is a sectional view before a hook is bent, FIG. 4B is a sectional view when coils and an equalizer are locked to the hook, and FIG. 4C is a sectional view when the hook, the coils, and the equalizer are electrically connected to each other;

FIGS. 5A, 5B, and 5C are sectional views of a main portion of a commutator assembly according to an embodiment 5 of the present invention, wherein FIG. 5A is a sectional view before a hook is bent, FIG. 5B is a sectional view when coils and an equalizer are locked to the hook, and FIG. 5C is a sectional view when the hook, the coils, and the equalizer are electrically connected to each other;

FIGS. 6A, 6B, and 6C are sectional views of a main portion of a commutator assembly according to an embodiment 6 of the present invention, wherein FIG. 6A is a sectional view before a hook is bent, FIG. 6B is a sectional view when coils and an equalizer are locked to the hook, and FIG. 6C is a sectional view when the hook, the coils, and the equalizer are electrically connected to each other;

FIGS. 7A, 7B, and 7C are sectional views of a main portion of a commutator assembly according to an embodiment 7 of the present invention, wherein FIG. 7A is a sectional view before a hook is bent, FIG. 7B is a sectional view when coils and an equalizer are locked to the hook, and FIG. 7C is a sectional view when the hook, the coils, and the equalizer are electrically connected to each other;

FIGS. 8A, 8B, and 8C are sectional views of a main portion of a commutator assembly according to an embodiment 8 of the present invention, wherein FIG. 8A is a sectional view before a hook is bent, FIG. 8B is a sectional view when coils and an equalizer are locked to the hook, and FIG. 8C is a sectional view when the hook, the coils, and the equalizer are electrically connected to each other;

FIGS. 9A, 9B, and 9C are sectional views of a main portion of a commutator assembly according to an embodiment 9 of the present invention, wherein FIG. 9A is a sectional view before a hook is bent, FIG. 9B is a sectional view when coils and an equalizer are locked to the hook, and FIG. 9C is a sectional view when the hook, the coils, and the equalizer are electrically connected to each other;

FIGS. 10A, 10B, and 10C are sectional views of a main portion of a commutator assembly according to an embodiment 10 of the present invention, wherein FIG. 10A is a sectional view before a hook is bent, FIG. 10B is a sectional view when coils and an equalizer are locked to the hook, and FIG. 10C is a sectional view when the hook, the coils, and the equalizer are electrically connected to each other;

FIGS. 11A, 11B, and 11C are sectional views of a main portion of a commutator assembly according to an embodiment 11 of the present invention, wherein FIG. 11A is a sectional view before a hook is bent, FIG. 11B is a sectional view when coils and an equalizer are locked to the hook (the coils and the equalizer are omitted), and FIG. 11C is a sectional view when the hook, the coils, and the equalizer are electrically connected to each other(the coils and the equalizer are omitted);

DESCRIPTION OF THE PREFERRED EMBODIMENTS

Figure 4A:
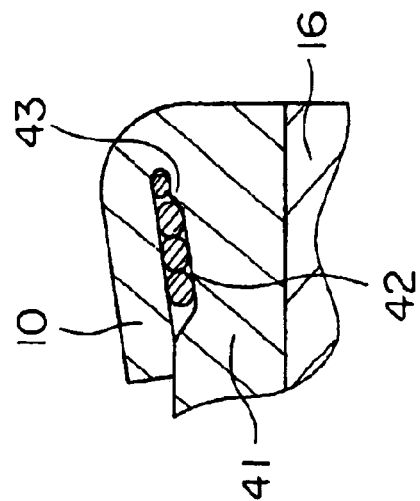

Embodiments of the present invention will be described below, wherein components same as or corresponding to the components shown in FIGS. 13 to 16 are denoted by the same reference numerals and the description thereof is omitted.

Embodiment 1

FIGS. 1A to 1C are sectional view of a main portion of a commutator assembly 20 of a first embodiment of the present invention. The commutator assembly 20 is composed of a commutator 21 and four brushes which are placed at equal intervals and caused to come into contact with the surface of the commutator 21 by the elastic force of springs. The commutator 21 is secured to an end of a shaft 1 and composed of commutator segments 22 as many as a plurality of slots disposed on the shaft 1 in the peripheral direction thereof and a base 16 for supporting the commutator segments 7. Further, a recessed portion 24 is formed on the peripheral surface 22a, which is located on the hook 10 side, of each of the commutator segments 22 which are in contact with the brushes to accommodate the coils 6a, 6b, and 6c of an armature 2.

In the commutator assembly 20, since the coils 6a, 6b, and 6c are accommodated in the recessed portion 24, the coil 6a at the extreme end of the hook 10 and the coil 6c at the root thereof are deformed at the same rate of deformation, as can be seen from FIG. 1C showing the state of the commutator device 20 after it has been subjected to so-called fusing in which the hooks 10 have been bent and electrically connected to the coils 6a, 6b, and 6c. As a result, the reliability of electric contact of the commutator segment 22 with the coils 6a, 6b, and 6c can be secured as well as the reliability of mechanical strength of the coils 6a, 6b, and 6c can be secured.

Further, when the hook 10 is bent, the extreme end 10a of the hook 10 comes into contact with the peripheral edge of the recessed portion 24, which prevents the coils 6a, 6b, and 6c in the recessed portion 24 from being excessively deformed even if the hook 10 is excessively pressed by an electrode.

Furthermore, since a current intensively flows to the portion where the extreme end 10a of the hook 10 is in contact with the peripheral surface 22a of the commutator segment 22 in fusing, the joint strength of them at the portion can be improved and stabilized by the easiness of deformation and the melting of the hook 10 which are achieved by the heat generated by the current.

Note that when the number and the wire diameter of the coils are changed, a proper rate of deformation of the coils can be secured by changing the depth and the width of the recessed portion.

Embodiment 2

FIGS. 2A to 2C are sectional views of a main portion of a commutator assembly 30 of a second embodiment of the present invention. While the commutator assembly 30 is similar to that of the embodiment 1 in that a recessed portion 32 is formed on a commutator segment 31 on a hook 10 side, it is different from the embodiment 1 in that the bottom of the recessed portion 32 inclines so as to increase its depth from the root of the hook 10 toward a direction opposite to an armature 2.

In general, when the hook 10 is bent, it is deformed with a certain radius of curvature at the root thereof and occupies a relatively large cavity at the root thereof than at the extreme end thereof after it is bent.

In the embodiment 2, after the hook 10 is bent, the cavity in the recessed portion 32 has the same size in the portion where the coil 6a is accommodated on the side thereof opposite to the armature 2 and in the portion where the coil 6c is accommodated on the armature 2 side thereof. As a result, the coils 6a, 6b, and 6c have the same rate of deformation, whereby the reliability of electric contact of the coils 6a, 6b, and 6c with the commutator segment 31 can be secured as well as the reliability of mechanical strength of the coils 6a, 6b, and 6c can be secured.

Further, since the bottom of the recessed portion 32 inclines, when the hook 10 is bent until it is approximately in parallel with the bottom, the extreme end 10a of the hook 10 bites into the peripheral surface 31a of the commutator segment 31 as shown in FIG. 2C. Accordingly, the extreme end 10a of the hook 10 is jointed to the peripheral surface 31a of the commutator segment 31 with larger strength so that the coils 6a, 6b, and 6c are further prevented from being removed from the hook 10 by the centrifugal force due to the rotation the armature 2.

Embodiment 3

FIGS. 3A to 3C are sectional views of a main portion of a commutator assembly 35 of an embodiment 3 of the present invention. The commutator assembly 35 is different from that of the embodiment 1 in that a stepped portion 38 is disposed adjacent to a recessed portion 37 formed to a commutator segment 36 and an equalizer 9 is placed on the stepped portion 38. The stepped portion 38 acts as a press and deformation promoting unit for promoting the press and deformation of the equalizer 9. The equalizer 9 is composed of a brass wire covered with an insulation film and having a wire diameter smaller than that of coils 6a, 6b, and 6c. The equalizer 9 may be composed of a red brass wire covered with an insulation film.

When the wire diameter of the equalizer 9 located at the root of the hook 10 is smaller than that of the coils 6, there is a possibility that the rate of deformation of the equalizer 9 is smaller that of the coils. However, the rate of deformation of the equalizer 9 can be made equal to that of the coils 6 by the provision of the stepped portion 38. Accordingly, it can be prevented that the reliability of electric contact between the coils 6, the equalizer 9, and the commutator segment 36 is lowered and that the reliability of mechanical strength of the coils 6 and the equalizer 9 are lowered.

In particular, when the commutator segment 36 and the coils 6a, 6b, and 6c are composed of a copper wire and the equalizer 9 is composed of a brass wire or a red brass wire the mechanical strength of which is greater than that of the copper wire, the equalizer 9 can be properly deformed by adjusting the height of the stepped portion 38 although it is difficult to press and deform the equalizer 9 as compared with the coils 6a, 6b, and 6c.

Embodiment 4

Figure 4B:
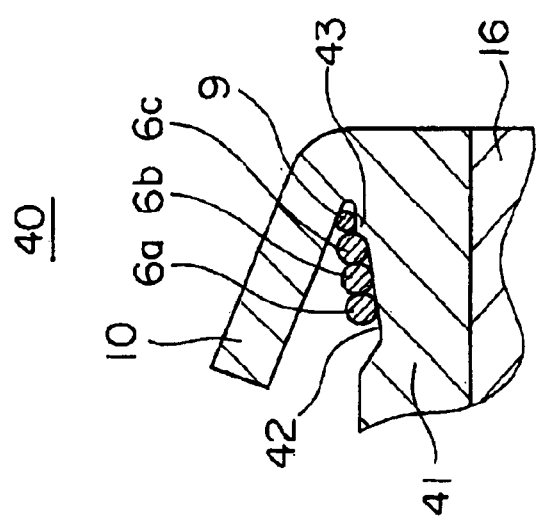
Figure 4C:
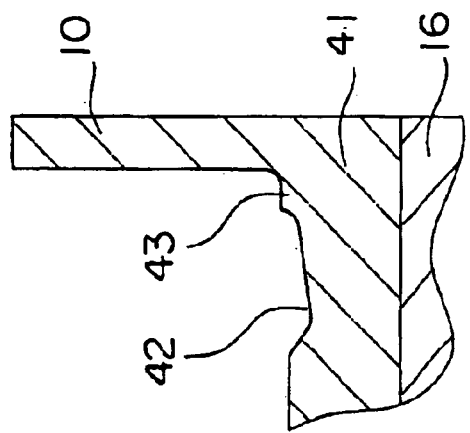

FIGS. 4A to 4C are sectional views of a main portion of a commutator assembly 40 of an embodiment 4 of the present invention. The commutator assembly 40 is different from that of the embodiment 2 in that a stepped portion 43 is disposed adjacent to a recessed portion 42 formed to a commutator segment 41 and an equalizer 9 is placed on the stepped portion 43. The equalizer 9 has a wire diameter smaller than that of coils 6a, 6b, and 6c.

In this embodiment, the bottom of the recessed portion 42 inclines from the root of a hook 10 toward the side opposite to an armature 2 so as to increase its depth similarly to the embodiment 2. After the hook 10 is bent, the cavity in the recessed portion 42 has the same size in the portion where the coil 6a is accommodated on the side thereof opposite to the armature 2 and in the portion where the coil 6c is accommodated on the armature 2 side thereof. As a result, the coils 6a, 6b, and 6c have the same rate of deformation, whereby the reliability of electric contact of the coils 6a, 6b, and 6c with the commutator segment 41 can be secured as well as the reliability of mechanical strength of the coils 6a, 6b, and 6c can be secured.

Further, since the bottom of the recessed portion 42 inclines, when the hook 10 is bent until it is approximately in parallel with the bottom, the extreme end 10a of the hook 10 bites into the peripheral surface 41a of the commutator segment 41 as shown in FIG. 4C. Therefore, the extreme end 10a of the hooks 10 is jointed to the peripheral surfaces 41a of the commutator segment 41 with greater strength so that the coils 6a, 6b, and 6c are further prevented from being removed from the hook 10 by the centrifugal force due to the rotation the armature 2.

Further, while the wire diameter of the equalizer 9 at the root of the hook 10 is smaller than that of the coils 6, the rate of deformation of the equalizer 9 can be made equal to that of the coils 6a, 6b, and 6c by the provision of the stepped portion 43.

Embodiment 5

Figure 5C:
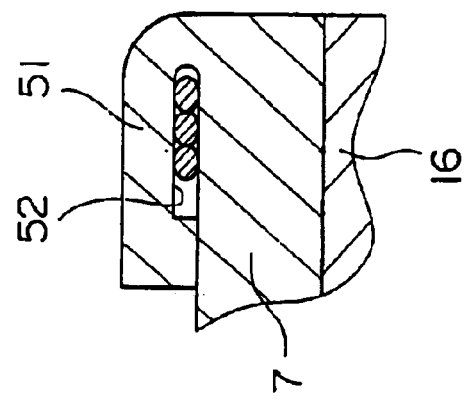
Figure 5B:
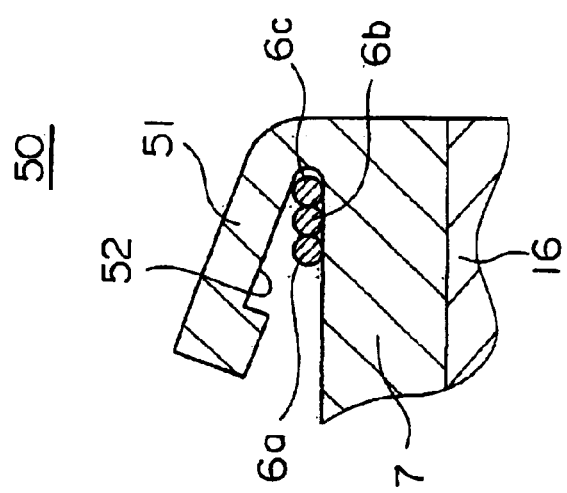
Figure 5A:
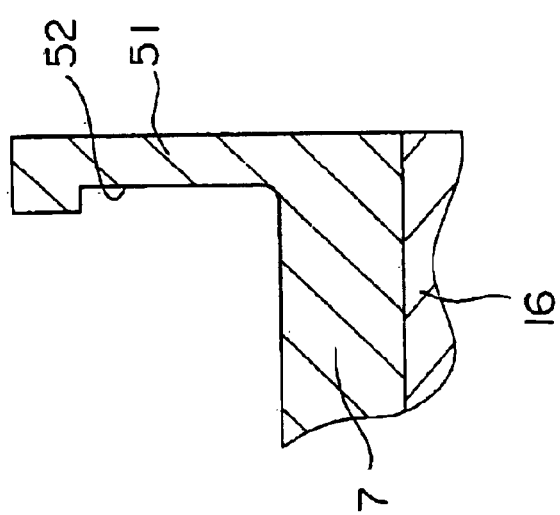

FIGS. 5A to 5C are sectional views showing a main portion of a commutator assembly 50 of an embodiment 5 of the present invention. The commutator assembly 50 of the embodiment 5 is different from that of the embodiment 1 in that a recessed portion 52 for accommodating coils 6a, 6b, and 6c is formed to a hook 51. The other arrangements of the commutator assembly 50 is similar to those of the embodiment 1, and the operation and working effect of the embodiment 5 is the same as that of the embodiment 1.

Embodiment 6

Figure 6A:
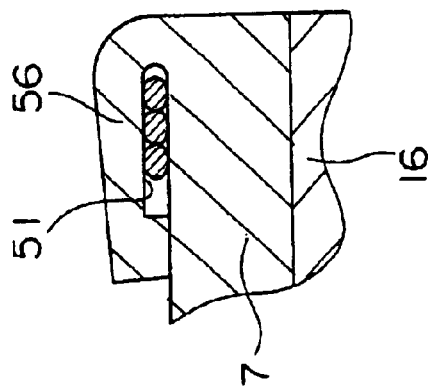
Figure 6B:
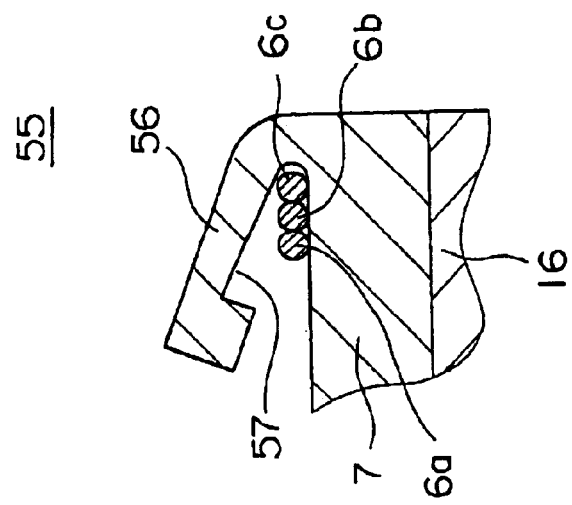
Figure 6C:
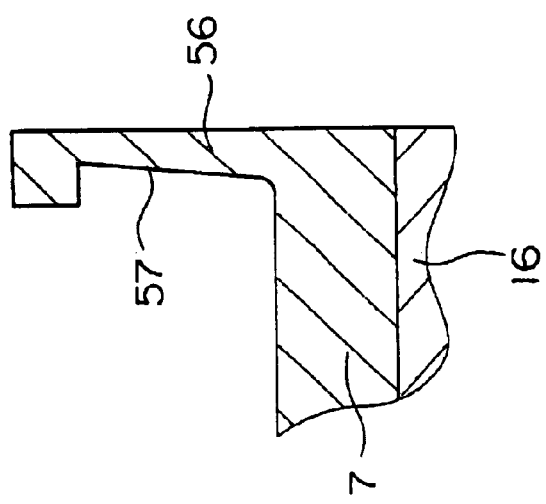

FIGS. 6A to 6C are sectional views showing a main portion of a commutator assembly 55 of an embodiment 6 of the present invention. The commutator assembly 55 of the embodiment 6 is different from that of the embodiment 2 in that recessed portion 57 for accommodating coils 6a, 6b, and 6c are formed to a hook 56.

The other arrangements of the commutator assembly 55 is similar to those of the embodiment 2, and the operation and working effect of the commutator assembly 55 is the same as that of the embodiment 2.

Embodiment 7

FIGS. 7A to 7C are sectional views of a main portion of a commutator assembly 60 of an embodiment 7 of the present invention. The commutator assembly 60 is different from that of the embodiment 3 in that a stepped portion 63 is disposed adjacent to a recessed portion 62 formed to a hook 61 and an equalizer 9, which has a wire diameter smaller than that of coils 6a, 6b, and 6c, is held between the stepped portion 63 and the root of a commutator segment 7.

The other arrangements of the commutator assembly 60 is similar to those of the embodiment 3, and the operation and working effect of the commutator assembly 60 is the same as that of the embodiment 3.

Embodiment 8

Figure 8C:
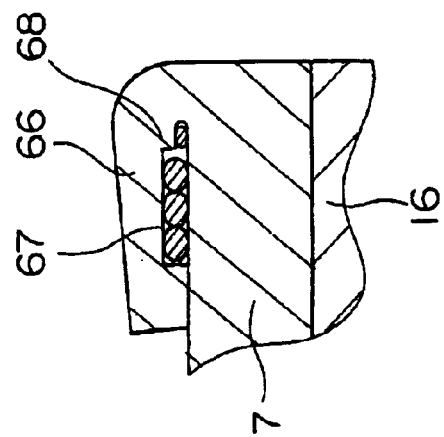
Figure 8B:
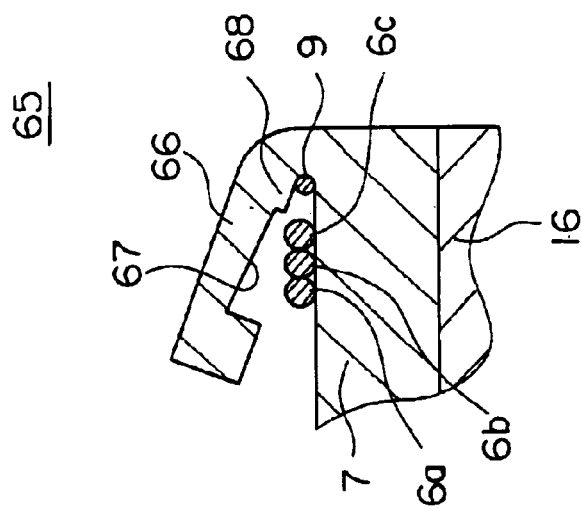
Figure 8A:
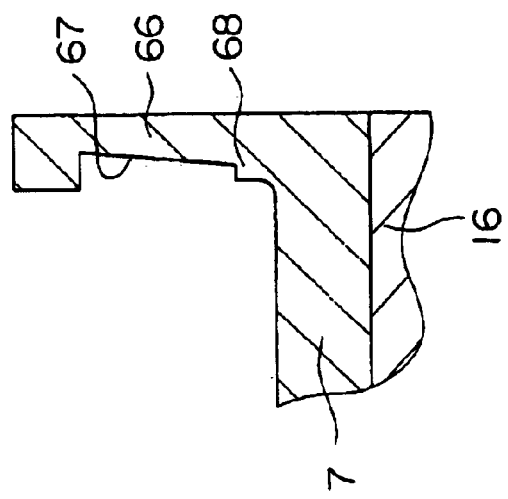

FIGS. 8A to 8C are sectional views of a main portion of a commutator assembly 65 of an embodiment 8 of the present invention. The commutator assembly 65 is different from that of the embodiment 4 in that a recessed portion 67 the bottom of which inclines is formed to a hook 66, a stepped portion 68 is disposed adjacent to the recessed portion 67, and an equalizer 9, which has a wire diameter smaller than that of coils 6a, 6b, and 6c, is held between the stepped portion 68 and the root of a commutator segment 7.

The other arrangements of the commutator assembly 65 is similar to those of the embodiment 4, and the operation and working effect of the commutator assembly 65 is the same as that of the embodiment 4.

Embodiment 9

FIGS. 9A to 9C are sectional views of a main portion of a commutator assembly 70 of an embodiment 9 of the present invention. The commutator assembly 70 is different from that of the embodiment 3 in that a recessed portion 72 having a given depth is formed to a hooks 7, a stepped portion 73 is disposed adjacent to the recessed portion 72, and an equalizer 9, which has a wire diameter smaller than that of coils 6a, 6b, and 6c, is held between the stepped portion 73 and the root of the hook 71.

The other arrangements of the commutator assembly 70 is similar to those of the embodiment 3, and the operation and working effect of the commutator assembly 70 is the same as that of the embodiment 3.

Embodiment 10

Figure 10C:
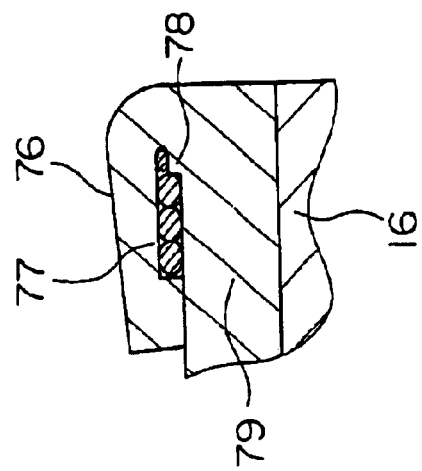
Figure 10B:
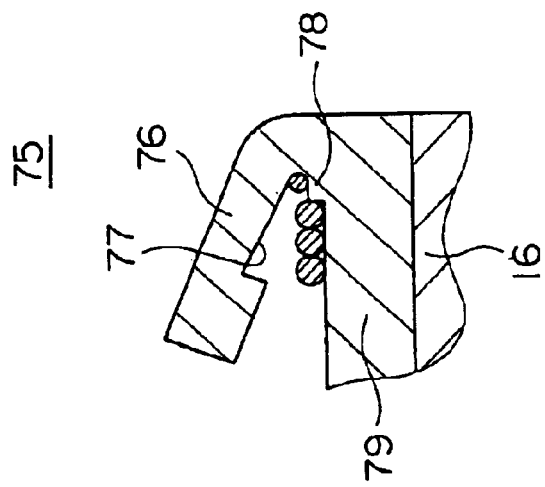
Figure 10A:
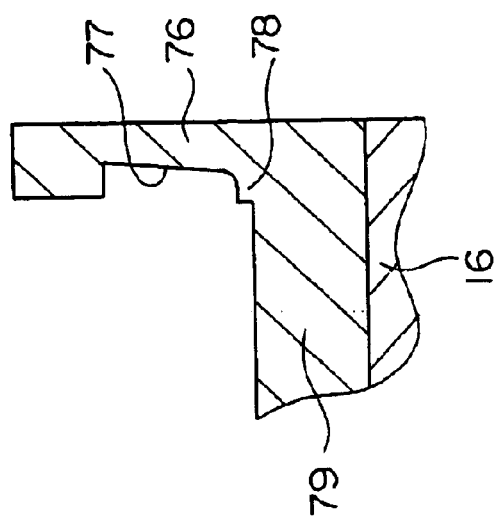

FIGS. 10A to 10C are sectional views of a main portion of a commutator assembly 75 of an embodiment 10 of the present invention. The commutator assembly 75 is different from that of the embodiment 4 in that a recessed portion 77 the bottom of which inclines is formed to a hook 76, a stepped portion 78 is disposed adjacent to the recessed portion 77, and an equalizer 9, which has a wire diameter smaller than that of coils 6a, 6b, and 6c, is held between the stepped portion 78 and the root of the hook 76.

The other arrangements of the commutator assembly 75 is similar to those of the embodiment 4, and the operation and working effect of the commutator assembly 75 is the same as that of the embodiment 4.

Embodiment 11

Figure 11A:
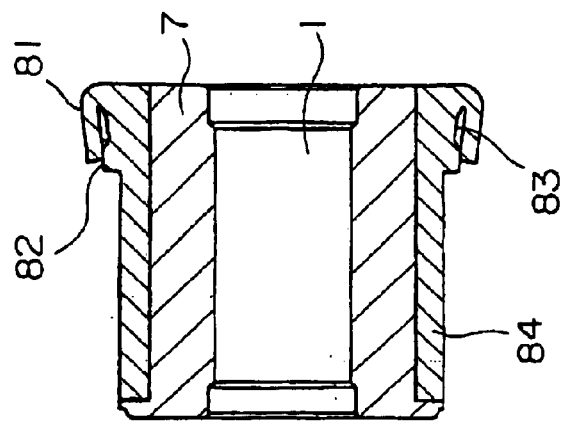
Figure 11B:
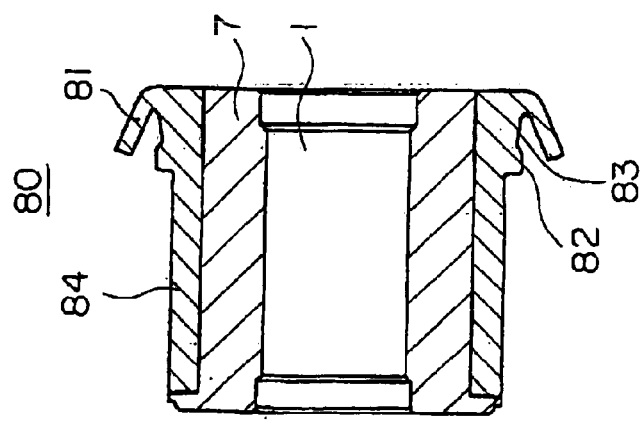
Figure 11C:
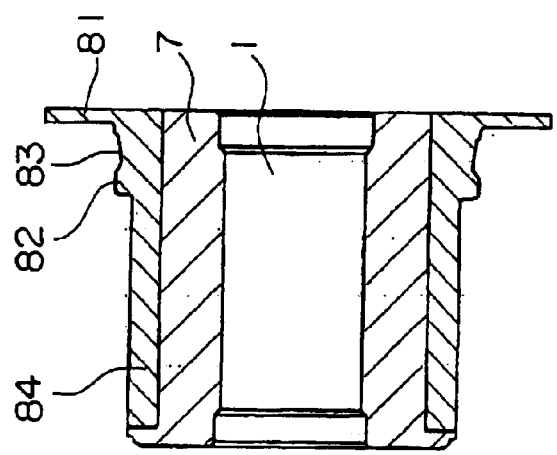

FIGS. 11A to 11C are sectional views of a main portion of an commutator assembly 80 of the present invention. In the commutator assembly 80, a large diameter portion 82, which has a diameter larger than that of a portion with which brushes come into contact, is formed to the root of a commutator segment 84. A recessed portion 83, in which accommodated are a plurality of coils (not shown) pressed and deformed by bending a hook 81, is formed to the large diameter portion 82. The recessed portion 83 has an inclining surface the depth of which increases as it is apart from the root of the hook 81.

Figure 12:
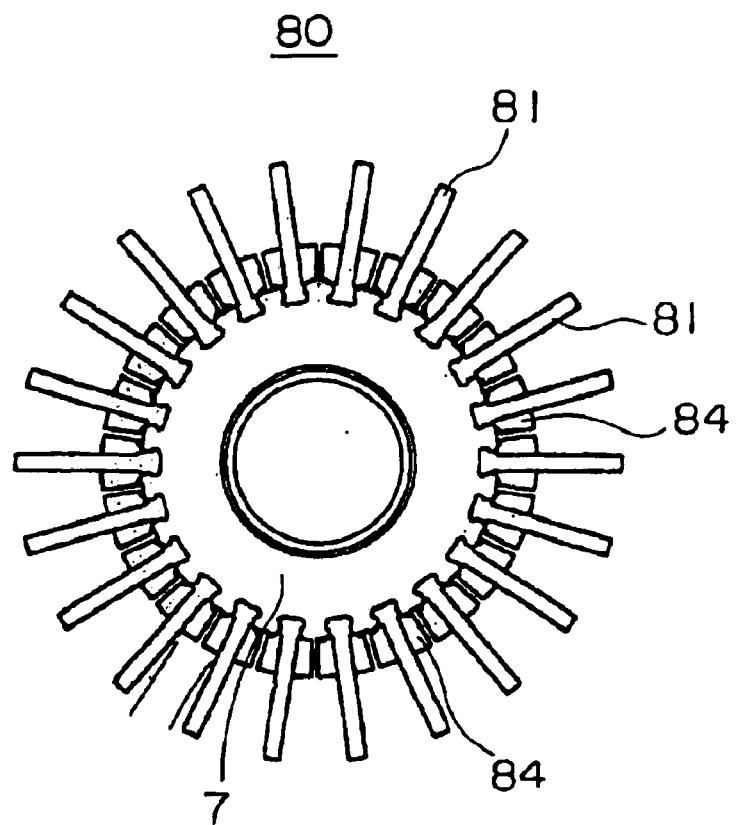
FIG. 12 is a front elevational view of the commutator assembly of FIG. 11.
Figure 13:
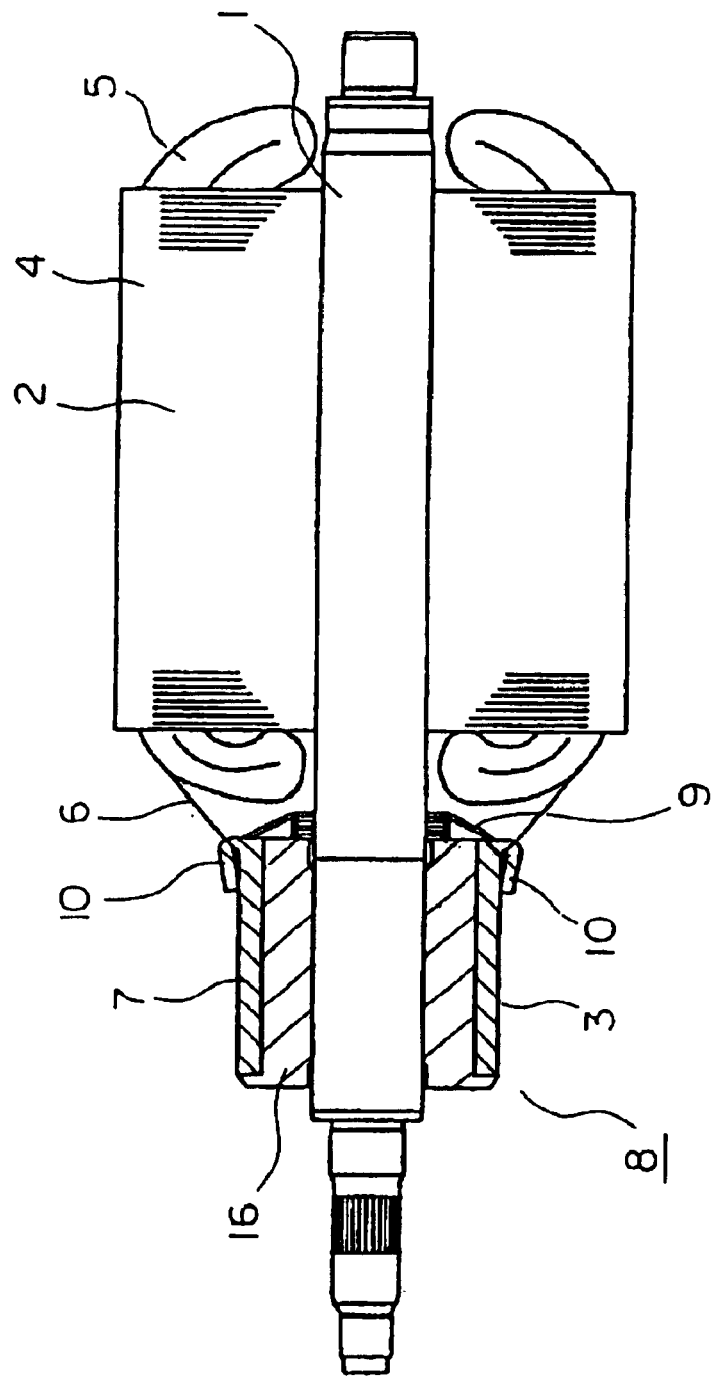
FIG. 13 is a sectional view of a main portion of a motor to which a conventional commutator assembly is assembled.
Figure 14:
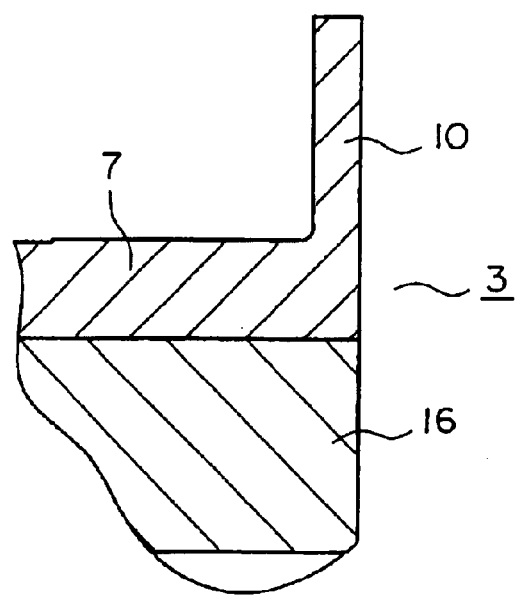
FIG. 14 is a sectional view of a main portion of the conventional commutator assembly before a hook is bent.
Figure 15:
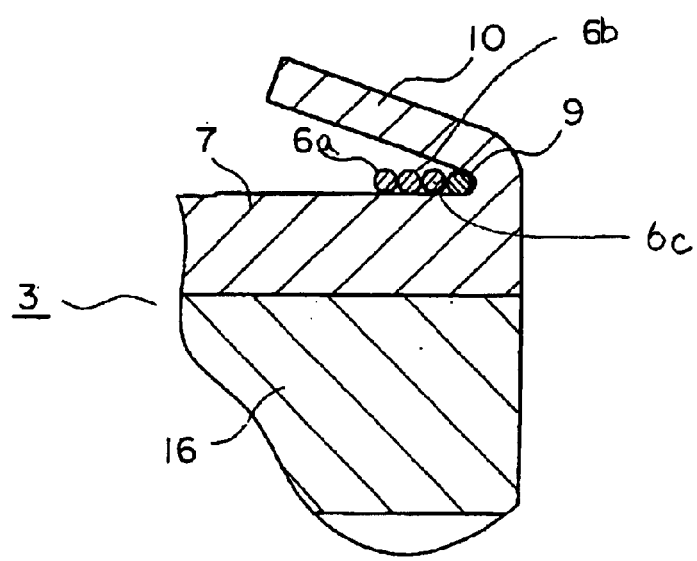
FIG. 15 is a sectional view of a main portion of the conventional commutator assembly when an equalizer and coils are locked to the hook.
Figure 16:
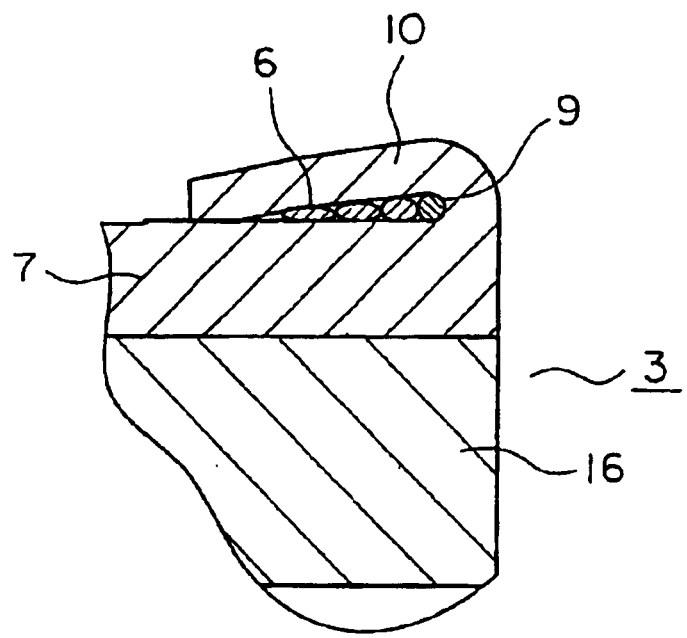
FIG. 16 is a sectional view of a main portion of the conventional commutator assembly when the hook, the coils, and the equalizer are electrically connected to each other.

As can be seen from FIG. 12, the commutator assembly 80 is arranged such that the hook 81 of the commutator segment 84 radially extends so that the distance between adjacent hooks 81 increases toward a radial direction.

Since the recessed portion 83 in which the coils are locked is formed to the large diameter portion 82 in the embodiment 11, the distance between adjacent recessed portions 83 also is increased as compared with the above respective embodiments, whereby coils having a larger diameter can be locked to the hook 81 and a larger current can be supplied to the coils. As a result, a motor having a larger output can be provided.

Note that while the stepped portion is formed to the edge of the recessed portion in the above embodiments, when, for example, an equalizer having a small wire diameter is disposed between coils, the stepped portion may be disposed to a recessed portion with which the equalizer comes into contact.

The press and deformation promoting unit is not limited to the stepped portion formed to the peripheral edge of the recessed portion and may be composed of, for example, a projection.

In the commutator segments having the recessed portion and the commutator segments having the recessed portions and the stepped portions, the recessed portion and the stepped portion can be machined at the same time the commutator segments are machined, and a different machining process is not necessary. Note that the stepped portion may be formed by forging.

While the case in which the coils and the equalizer are used as conductive wires has been described, it is a matter of course that the present invention is not limited thereto.

Further, while the commutator assembly has been described as to the case in which it is applied to the motor, it is needless to say that the commutator segment is also applicable to an alternator.

As described above, according to a first aspect of the commutator assembly of the invention, the recessed portion, in which the plurality of conductive wires compressed and deformed by bending the hooks are accommodated, is formed to each of the commutator segments. Accordingly, the reliability of electric contact of the conductive wires with the commutator segments can be secured as well as the reliability of mechanical strength of the conductive wires can be secured.

When the hooks are bent, the extreme ends of the hooks come into contact with the peripheral edges of the recessed portions. Thus, even if the hooks are excessively bent, the conductive wires are prevent from being excessive deformed in the recessed portions.

When, for example, the conductive wires are jointed to the commutator segments by fusing, a current intensively flows to the portions where the extreme ends of the hooks are in contact with the peripheral surfaces of the commutator segments. Thus, the joint strength of them at the portions can be improved by the easiness of deformation and the melting of the hooks which are achieved by the heat generated by the current.

Further, when the number and the wire diameter of the conductive wires are changed, a proper rate of deformation of the conductive wires can be obtained by changing the depth and the width of the recessed portions.

According to a modification of the first aspect of the commutator assembly of the invention, the recessed portion is formed to the large diameter portion of the commutator segment. The large diameter portion has a diameter larger than the diameter of the portion, with which brushes come into contact, of the commutator and is formed to the root of the hook. Thus, the distance between adjacent recessed portions increases, whereby conductive wires having a larger diameter can be locked to the hooks, and a motor of higher output, for example, can be obtained.

According to a second aspect of the present invention, the recessed portion, in which the plurality of conductive wires compressed and deformed by bending the hooks are accommodated, is formed to each of the hooks. Thus, a second aspect of the present invention has the same effect of the first aspect of the present invention.

According to a modification of the first and second aspects of the commutator assembly of the invention, the recessed portion has an inclining surface formed thereto the depth of which increases as the inclining surface is apart from the root of the hook. Thus, the sizes of the respective parts of the cavities in the recessed portions can easily be made to the same size after the hooks are bent, whereby the conductive wires can be provided with the same rate of deformation. As a result, the reliability of electric contact of the conductive wires with the commutator segments can be more improved as well as the reliability of mechanical strength of the conductive wires also can be more improved.

Further, since the bottom of the recessed portion inclines, it is possible to bend the hook until it is in parallel with the bottom and to cause the extreme end of the hook to bite into the peripheral surface of the commutator segment so that the extreme end of the hook can be jointed to the peripheral surface of the commutator segments with greater strength.

According to a modification of the first and second aspects of the commutator assembly of the invention, the press and deformation promoting unit is formed to the recessed portion to promote the press and deformation of the conductive wires. Thus, even if conductive wires, which have a wire diameter smaller than that of other conductive wires, are included in the conductive wires, the conductive wires having the smaller diameter can be compressed similarly to the other conductive wires.

According to a modification of the first and second aspects of the commutator assembly of the invention, since the press and deformation promoting unit is composed of a stepped portion, the press and deformation promoting unit can simply be formed.

According to a modification of the first and second aspects of the commutator assembly of the invention, when the plurality of conductive wires include conductive wires having a different wire diameter, the respective conductive wires can similarly be deformed and compressed, whereby the reliability of electric contact of the conductive wires with the commutator segments can be secured as well as the reliability of mechanical strength of the conductive wires can be secured.

According to a modification of the first and second aspects of the commutator assembly of the invention, when the plurality of conductive wires include conductive wires formed of a different material, an effect similar to that of the above modification can be obtained.

According to a modification of the first and second aspects of the commutator assembly of the invention, when the plurality of conductive wires are the plurality of coils constituting the winding of the armature and the equalizers for electrically connecting commutator segments, which should have the same electric potential, to each other, the reliability of electric contact of the coils and equalizers with the commutator segments can be secured as well as the reliability of mechanical strength of the coils can be secured.

According to a modification of the first and second aspects of the commutator assembly of the invention, the plurality of conductive wires are the plurality of coils constituting the winding of the armature and the equalizers for electrically connecting commutator segments, which are formed of a material different from that of the coils and should have the same electric potential, to each other, the reliability of electric contact of the coils and equalizers with the commutator segments can be secured as well as the reliability of mechanical strength of the coils can be secured.

According to a modification of the first and second aspects of the commutator assembly of the invention, the equalizers are composed of the brass wire having the insulating film formed on the surface thereof. While the equalizers have larger hardness, greater mechanical strength, lower thermal conduction, and lower electric conduction as compared with those of equalizers composed of a copper wire, the equalizers are sufficiently deformed and the wire diameter thereof is increased due to the large electric resistance thereof. As a result, the area where the hook is in contact with the equalizer is increased, whereby the reliability of electric connection of the hooks to the equalizers can be improved.

According to a modification of the first and second aspects of the commutator assembly of the invention, the equalizers are composed of the red brass wire having the insulating film formed on the surface thereof. While the equalizers have larger hardness, greater mechanical strength, lower thermal conduction, and lower electric conduction as compared with those of equalizers composed of a copper wire, the equalizers are sufficiently deformed and the wire diameter thereof is increased due to the large electric resistance thereof. As a result, the area where the hook is in contact with the equalizer is increased, whereby the reliability of electric connection of the hooks to the equalizers can be improved.

What is claimed is:

1. A commutator assembly for a motor, comprising:
   a commutator including a base secured to a shaft to which an armature is secured and commutator segments disposed on the outer peripheral surface of said base in a peripheral direction, said commutator segments having hooks formed on one side thereof which are bent to lock in place a plurality of conductive wires,
   wherein a recessed portion, in which the plurality of conductive wires, compressed and deformed by the bending of said hooks, are accommodated, is formed in each of said commutator segments.

2. A commutator assembly according to claim 1, wherein press and deformation promoting means is formed to said recessed portion to promote the press and deformation of the conductive wires.

3. A commutator assembly according to claim 2, wherein said press and deformation promoting means comprises a stepped portion.

4. A commutator assembly according to claim 1, wherein the plurality of conductive wires include conductive wires formed of a different material.

5. A commutator assembly for a motor, comprising:
   a commutator including a base secured to a shaft to which an armature is secured and commutator segments disposed on the outer peripheral surface of said base in a peripheral direction, said commutator segments having hooks formed on one side thereof which are bent to lock in place a plurality of conductive wires,
   wherein a recessed portion, in which said plurality of conductive wires, compressed and deformed by the bending of said hooks, are accommodated, is formed in each of said hooks.

* * * * *